Feb. 1, 1955   M. R. SHAFER   2,700,891
DIRECT READING VISCOMETER
Filed Dec. 1, 1953   2 Sheets-Sheet 2
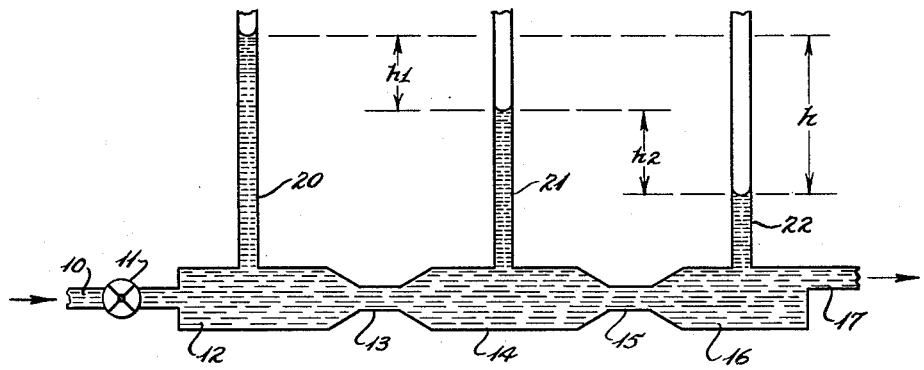
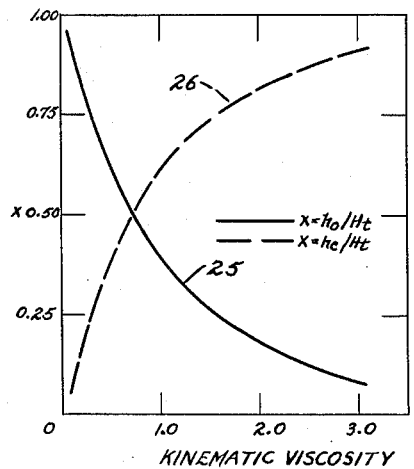
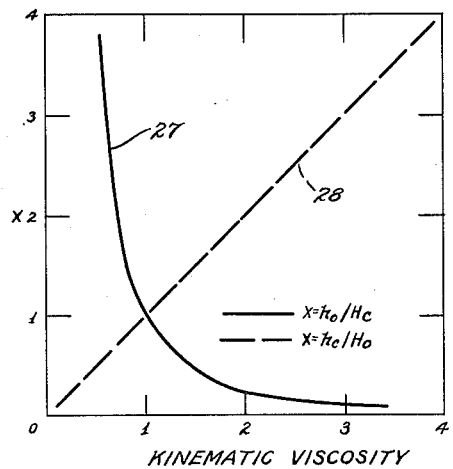
INVENTOR
Montgomery R. Shafer

United States Patent Office 2,700,891
Patented Feb. 1, 1955

2,700,891

DIRECT READING VISCOMETER

Montgomery R. Shafer, Rockville, Md., assignor to the United States of America as represented by the Secretary of the Navy Application December 1, 1953, Serial No. 395,628

4 Claims. (Cl. 73—55)

(Granted under Title 35, U. S. Code (1952), sec. 266)

This invention relates to viscometers for use in the determination of the kinematic viscosity of liquids.

Viscometers have been long in use—such as the Ostwald, Saybolt and other types—in which viscosity values are determined by the measurement of a time interval and then conversion factors subsequently applied to obtain the desired viscosity readings. In many cases, also, these prior instruments are usable only on collected samples of liquids as distinguished from continuous flow indication.

Briefly stated, the invention consists in use of a flow system provided with two fixed restrictions, with different configurations, connected in series. The liquid of unknown viscosity is caused to flow through these restrictions while, simultaneously, the loss in liquid head across either one of the restrictions or across the sum of the two restrictions is maintained at a selected constant value. Under these conditions the loss of head across the restrictions not held constant depends solely upon the kinematic viscosity of the liquid flowing through the restrictions; and, in conjunction with manometric columns, the kinematic viscosity of the liquid may be read directly and continuously with liquid flow after calibration of the instrument with a few liquids of known viscosities.

An important object of the invention, therefore, is to provide a direct reading viscometer, thus eliminating correction factors, conversion units, and/or computations. An object also, is to provide a viscometer which is not dependent on collected liquid samples but which is operative on continuous flow. Still another object is to provide a viscometer which is flexible in use, in that both the range and sensitivity may be varied at will. Further objects are to provide apparatus which is simple in structure and operation and accurate in result.

Other objects and many of the attendant advantages of this invention will be readily appreciated on reference to the following description when considered in connection with the accompanying drawings in which:

Fig. 2 is a schematic showing of the fundamental flow system of the viscometer.

Fig. 3 shows curves giving variations of loss in head with kinematic viscosity for an orifice and capillary restriction in series with a constant total loss in head; and Fig. 4 shows curves giving variation of loss in head with kinematic viscosity for an orifice and capillary restriction in series with a constant loss in head across either restriction.

Figure 1:
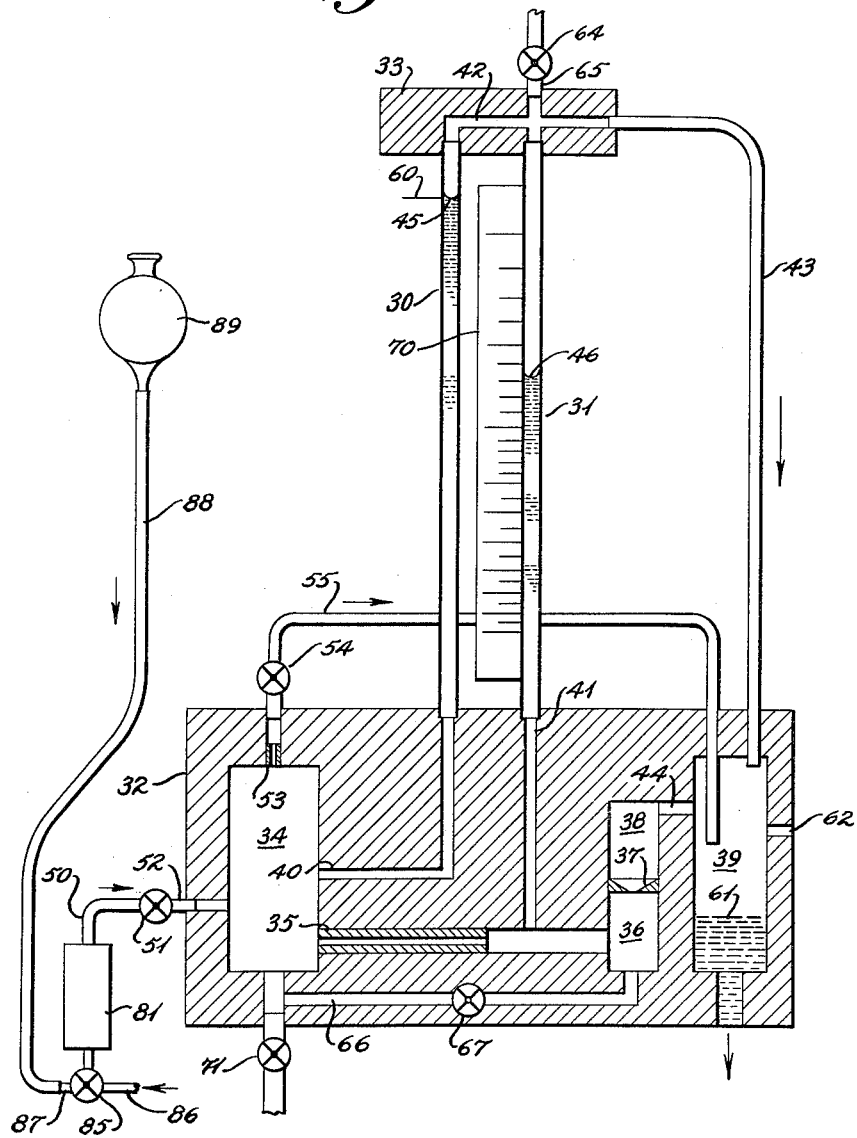
Fig. 1 is a schematic sectional elevation of the viscometer.

The invention is based on general theoretical considerations which will be briefly considered by the methods of dimensional analysis. Fig. 2 illustrates the basic flow system including an inlet 10, a control valve 11, an entrance chamber 12, a first flow restriction 13, an intermediate flow chamber 14, a second flow restriction 15, an exit chamber 16, and an outlet 17, all connected in series. Manometer tubes 20, 21, 22 are mounted on, and in connection with, entrance, intermediate and exit chambers 12, 14 and 16 respectively. It is assumed that this unit is filled with liquid flow in the indicated direction at the volumetric flow rate Q.

Consider the difference in pressure $\Delta P_t$ between chambers 12 and 16, the subscript $t$ indicating total. As is well known for the flow of an incompressible, viscous fluid through a fixed flow passage, $\Delta P_t$ could be influenced by the flow rate Q, the density $\rho$, the absolute viscosity of the fluid and by the shape of the flow passage which may be represented by a characteristic length D. As no other quantities affect the pressure drop significantly, this interdependence may be expressed by the general equation $$F(\Delta P_t, Q, \rho, \eta, D) = 0 \quad (1)$$

where F indicates "function of."

In a similar manner the general equation $$Q = F'(\Delta P_{15}, \rho, \eta, D) \quad (1a)$$

may be formed in which $F'$="function of" and $\Delta P_{15}$= pressure drop across restriction 15.

By combining Equations 1 and 1a there results $$F''(\Delta P_t, \rho, \eta, D, \Delta P_{15}) = 0 \quad (1b)$$

which by the usual practice in dimensional analysis may be reduced to $$\eta = D\sqrt{\rho \Delta P_t}\, \varphi\, (\Delta P_t / \Delta P_{15}) \quad (2)$$

where $\varphi$="function of."

On referring to Fig. 2 it is apparent that the three manometer tubes 20, 21 and 22, containing the same liquid as that flowing through the system, indicate the heads in chambers 12, 14 and 16 respectively. The tops of these manometers are open to a common pressure source, so that the difference in levels in manometers 20 and 21 is the loss of head $h_{13}$ across restriction 13; the difference in levels of manometers 21 and 22 is the loss in head $h_{15}$ across restriction 15; and the difference in levels of manometers 20 and 22 is the total loss in head $h_t = (h_{13}h_{15})$ across the two restrictions in series.

Pressure differences are related to loss in head by the familiar equation $$\Delta P = \rho g h \quad (3)$$

where $g$=gravity so that Equation 2 may be written as $$\eta = D\sqrt{\rho^2 g h_t}\, \varphi\, (h_t / h_{15}) \quad (4)$$

Since this consideration is limited to a selected combination of fixed restrictions, D is constant and Equation 4 may be written $$\nu = \eta/\rho = \sqrt{h_t}\, \varphi\, (h_t / h_{15}) \quad (5)$$

where $\nu$= kinematic viscosity. The constant quantities D and $g$ are absorbed in the function $\varphi$.

The kinematic viscosity is now seen to be proportional to the square root of the difference in head between manometers 20 and 22 and to depend upon the ratio of the loss in heads $h_t$ and $h_{15}$. If, therefore, by means of control valve 11, the loss in head $h_t$ is maintained at some selected constant value $H_t$ when flowing liquids of different densities and viscosities, then Equation 5 becomes $$\nu = \sqrt{H_t}\, \varphi\, (H_t / h_{15}) = A\varphi'(h_{15}) \quad (6)$$

where A has a constant value for any given flow system and selected constant total loss in head $H_t$.

Stated in other words, Equation 6 means that for a flow system of fixed configuration, such as that shown in Fig. 2, if the total loss in head $h_t$ is always maintained at the constant value $H_t$ when flowing different liquids, the loss in head $h_{15}$ will be a function of the kinematic viscosity alone.

By the same methods as those above applied, it can be shown that when any one of the three quantities $h_t$, $h_{13}$, and $h_{15}$ is held constant, the kinematic viscosity is a function of either of the other two. For each separate possible combination, the form of the function $\varphi'$ is different, and in this manner the characteristics of the final instrument may be varied widely to suit specific needs and desires as to method of operation, range and sensitivity. In addition, these instrument characteristics are also subject to control through the selection of different configurations, i. e., different flow characteristics, of the two flow restrictions.

The final development of a practical meter for kinematic viscosity requires the provision of means for indicating $h_{15}$ and $H_t$, means for controlling $H_t$, and the selection of restrictions, 13 and 15 so that the function $\varphi'$ will have a usable form. As a guiding principle in the selection of the fixed restrictions, it is logical that the loss in head of one should be influenced to a considerable extent by variations in viscosity, while the loss in head of the other should be influenced to a lesser extent by the same variations in viscosity. This end can be achieved, for example, by using a tube whose length is many times its diameter, in series with a thin-plate orifice.

In developing the relations arising from use of a capillary tube in series with a thin-plate orifice, use is made of the equations $\Delta P_c = \rho g h_c$ and $u = Q/\pi r^2$ and of the Hagen-Poiseuille law, $$\Delta P_c = \frac{\rho u^2 L}{4r}\left(\frac{32\pi}{\rho u r}\right) + m\frac{\rho u^2}{2} \qquad (7)$$

where the subscript $c$=capillary, $u$=mean velocity of flow through the tube and the term $$m\frac{\rho u^2}{2}$$

represents the change in kinematic energy due to the change in velocity distribution, i. e., the end effects. Using the above relations the kinematic viscosity may be written as $$\nu = \pi/\rho = (\pi r^4 g h_c/8QL) - (mQ/16\pi L) \qquad (8)$$

which with additional transpositions and substitutions becomes $$\nu = \frac{r^4\sqrt{g}h_c}{2\sqrt{2}LCd^2\sqrt{h_0}} - \frac{mCd^2\sqrt{2gh_o}}{64L} \qquad (9)$$

through use of the orifice equation $Q = (\pi/4)(d^2\sqrt{2gh_o})$ where the subscript $o$=orifice; and $C$ and $d$ the coefficient of discharge and diameter of the orifice respectively.

If the end effects of the tubing are assumed to be insignificant and $C$, the coefficient of orifice discharge, constant, and stating $B = r^4\sqrt{g}/2\sqrt{2}LCd^2$, Equation 9 may be written as $$\nu = Bh_c/\sqrt{h_0} = Bh_c/\sqrt{h_t} - h_c = B(h_t - h_0)/\sqrt{h_0} \qquad (10)$$

Thus it appears that if either $h_t$, $h_c$ or $h_o$ be held constant when different liquids flow through the system, then the others are functions of the kinematic viscosity. These relationships are shown in Figs. 3 and 4. Fig. 3 represents that condition in which $h_t$ is held constant at a value $H_t$ when flowing different liquids. The solid curve 25 shows the variation of $h_o/H_t$ with kinematic viscosity and the dashed curve 26 gives $h_c/H_t$ variation with kinematic viscosity. Fig. 4 in solid curve 27 shows variations between $h_o/H_c$ and kinematic viscosity for $h_c$ constant at $H_c$ and dashed curve 28 shows variations between $h_c/h_o$ and kinematic viscosity for $h_o$ constant at $H_o$. From Figs. 3 and 4 it is apparent that an instrument having almost any desired sensitivity to viscosity can be developed. A special prototype instrument having a range of 0.5 to 5.0 centistokes, and an accuracy of about one percent in all values of kinematic viscosity within this range, will now be described, reference being made to Fig. 1.

The instrument consists of two vertically positioned transparent manometer tubes 30 and 31 having their lower and upper ends disposed in fluid-tight relationship within both the lower body 32 and the top manometer support 33, the latter being rigidly fastened to lower body 32 by conventional means.

Lower support body 32 contains entrance chamber 34 which connects through first flow restriction 35 intermediate flow chamber 36, second flow restriction 37, and discharge passage 38 to exit chamber 39, provides a flow system consisting of two restrictions in series, the first being of the capillary type and the second of the thin-plate orifice type. Manometer passage 40, connecting entrance chamber 34 to manometer 30, and manometer passage 41 connecting intermediate flow chamber 36 to manometer 31, provide means of admitting the liquid to manometers 30 and 31 respectively.

The tops of manometers 30 and 31, interconnecting flow passage 42, and manometer return tube 43 are all subjected to the gas pressure existing at outlet 44 of discharge passage 38. Thus, it is readily apparent that the vertical displacement between outlet 44 and liquid level 45 in manometer 30 is the total loss in head $h_t$ through the flow system. It is also apparent that the vertical displacement between outlet 44 and liquid level 46 in manometer 31 is the loss in head $h_{37}$ existing between intermediate flow chamber 36 and exit chamber 39.

Under moderate pressure the liquid of unknown viscosity is admitted into entrance chamber 34 by means of entrance connection 50, flow control valve 51, and entrance passage 52, a filter 81, to prevent clogging by dirt or lint, being included in the entrance conduit. A two-way valve 85 at the filter entrance connects with two inlet pipes 86 and 87, 86 joining the usual pressure fluid source and 87 joining, by flexible conduit 88, the leveling bulb 89 for use in viscosity determinations where a fluid pressure source is not available. The top of entrance chamber 34, through restrictive bleed 53, flow valve 54, and flow tube 55, connects to exit chamber 39, thereby providing means of eliminating all gas and vapor from entrance chamber 34. Restrictive bleed 53, flow valve 54, and flow tube 55, as a result of their comparatively high flow capacity, also provide means for the continuous introduction of new liquid into entrance chamber 34 and thence to the viscosity-sensitive flow system. It is apparent that the rate of flow of liquid through flow tube 55, as controlled by restrictive bleed 53 and valve 54, can have no effect upon the location of liquid level 46 in manometer 31, provided liquid level 45 in manometer 30 is maintained at reference mark 60 by adjustment of flow control valve 51. Thus, the size of restrictive bleed 53 may be selected to give any desired rate of introduction of new liquid into entrance chamber 34, without in any manner affecting the calibration of the instrument.

In order that liquid levels 45 and 46 of manometers 30 and 31 shall indicate the loss of heads between entrance chamber 34 and outlet 44 and between the intermediate flow chamber 36 and outlet 44, respectively, it is necessary that exit chamber liquid level 61 be always below outlet 44. To assure this condition, exit chamber 39 is provided with exit vent 62, vertically positioned below outlet 44, so that whenever liquid level 61 becomes too high, the condition will be indicated by the discharge of liquid through exit vent 62.

To prevent accumulation of liquid in manometer return tube 43, with consequent effect on the liquid levels 45 and 46 in manometer 30 and 31, respectively, top manometer support 33 is provided with valve 64 connecting by tube 65 to the manometer tube system 30—35—43. When this valve 64 is open atmospheric air pressure is established in the two manometers and return passage 43 so that the manometer tube pressure is identical to that existing at outlet 44, when the exit chamber liquid level 61 is below vent 62.

Since the first flow restriction 35 offers a comparatively high resistance to the flow of liquids, it is desirable that the gas and vapor in the flow system of the instrument be definitely and rapidly eliminated before performing a viscosity determination. This step is performed utilizing flow tube 55 as previously described and also by-pass duct 66 connecting the base of entrance chamber 34 to the base of intermediate chamber 36 through valve 67. Thus, to eliminate gas and vapor from the instrument, it is necessary only to close manometer valve 64, to open flow valve 54 and by-pass valve 67. Then flow control valve 51 is opened sufficiently to cause a rapid upward flow of liquid through manometers 30 and 31 and a corresponding downward flow through return tube 43 to exit chamber 39. Thus, the entire system is filled completely with liquid and all vapor and gas are eliminated from entrance chamber 34, first flow restriction 35, intermediate flow chamber 36, second flow restriction 37, manometer passages 40 and 41 and manometers 30 and 31.

After elimination of the gas and vapor, flow control valve 51 is closed and manometer valve 64 is opened, thus subjecting the tops of the manometers to atmospheric pressure. By-pass valve 67 is then closed, so that entrance chamber 34 connects to intermediate flow chamber 36 through the first flow restriction only. Flow control valve 51 is then opened and adjusted until liquid level 45 in manometer 30 is maintained at reference mark 60. The liquid level 46 in manometer 31 is then observed.

Manometer 31 is provided with scale 70 calibrated, for the particular instrument in which $H_t$ corresponds to reference mark 60, in any desired units of kinematic viscosity. This calibration is best accomplished by using Equation 5 as applied to several liquids of known viscosities: These liquids are separately passed through the instrument at different flow rates and $h_t$ and $h_{37}$ values taken, expressed as centimeters of vertical displacement above outlet 44. The ratios $\nu/h_t$ and $h_t/h_{37}$ are then computed for each liquid and each experimental value of $h_t$ and these ratios are plotted to form a curve giving the explicit function $\varphi$ of Equation 5 for this particular instrument. For a given value of $h_t$, as 70 centimeters, different values of viscosity are assumed and the ratio $\nu/70$ computed. Then the corresponding ratio $70/h_{37}$ is taken from the curve, giving values of $h_{37}$, corresponding to different values of viscosity, from which the scale is formed. This calibrated scale, in conjunction with liquid level 46 of manometer 31, provides a direct indication of kinematic viscosity when liquid level 45 of manometer 30 is maintained at reference mark 60 by adjustment of flow control valve 51.

After a viscosity determination has been completed, all liquid can be drained from the instrument through drain valve 71.

In addition to the described apparatus a thermometer permitting determinations of separate samples at the same temperature, or permitting temperature corrections, may be used where desirable.

Modifications of the present invention may be made in the light of the disclosure, and it is to be understood, therefore, that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. A direct reading viscometer, comprising a support; entrance, intermediate and exit chambers mounted on said support; a passage including a first restriction between said entrance and intermediate chambers; a passage including a second restriction between said intermediate and exit chambers; a first manometer tube connected to said entrance chamber and having a fixed height marking thereon; a second manometer tube connected to said intermediate chamber; a scale calibrated in viscosity units operatively related to the liquid level in said second manometer tube; means for controlling the flow of liquid through said viscometer, whereby, the level of liquid in said first manometer tube is maintained at said fixed height marking during viscometer readings; and means including a single by-pass around said first and second restrictions for the elimination of gas and vapor from said entrance chamber and for the continuous introduction of new liquid into said entrance chamber.

2. The viscometer as defined in claim 1, said by-pass being normally open during a viscosity determination whereby air, vapor and liquid are continuously removed from the entrance chamber and by-passed around said first and second restrictions.

3. A direct reading viscometer, comprising a support; entrance, intermediate and exit chambers mounted on said support; a passage including a first restriction between said entrance and intermediate chambers; a passage including a second restriction between said intermediate and exit chambers; a first manometer tube connected to said entrance chamber and having a fixed height marking thereon; a second manometer tube connected to said intermediate chamber; a scale calibrated in viscosity units operatively related to the liquid level in said second manometer tube; means for controlling the flow of liquid through said viscometer, whereby the level of liquid in said first manometer tube is maintained at said fixed height marking during viscometer readings; and two by-pass conduits, the first by-pass around said first and second restrictions being normally open to provide a continuous by-pass for air, vapor and liquid and the second by-pass around said first restriction only having a valve whereby said second by-pass may be opened prior to viscosity measurement and closed during such measurement.

4. The viscometer as defined in claim 3 including additional means for closing the exposed ends of said manometer tubes and means including a conduit connected between said exit chamber and said manometer tubes at a point on the liquid side of said manometer closing means, whereby overflow liquid from said manometer tubes when said manometer ends are closed, is diverted to said exit chamber.

References Cited in the file of this patent

UNITED STATES PATENTS

| 1,534,091 | Smoot | Apr. 21, 1925 |
| 1,881,200 | Leask et al. | Oct. 4, 1932 |

FOREIGN PATENTS

| 405,090 | Germany | Oct. 27, 1924 |
| 241,652 | Great Britain | Oct. 29, 1925 |